United States Patent [19]

Kohler et al.

[11] Patent Number: 5,357,852
[45] Date of Patent: Oct. 25, 1994

[54] METHOD AND APPARATUS FOR PRODUCING REDUCED LACTOSE MILK

[75] Inventors: James J. Kohler, Gem Lake; Alan B. Erickson, Shoreview; Jenny L. Meyer, Mahtomedi, all of Minn.

[73] Assignee: Kohler Mix Specialties, White Bear Lake, Minn.

[21] Appl. No.: 892,231

[22] Filed: Jun. 2, 1992

[51] Int. Cl.[5] .................. A23C 19/00; B65B 43/42
[52] U.S. Cl. ........................ 99/453; 99/456; 99/484; 141/69
[58] Field of Search ............... 99/452, 453, 455, 484, 99/456; 426/8, 34, 42, 40, 36, 522, 399, 401, 403; 141/69

[56] References Cited

U.S. PATENT DOCUMENTS

| | | | |
|---|---|---|---|
| 3,780,644 | 12/1973 | Canfield et al. | 99/455 |
| 4,552,190 | 11/1985 | Wilson et al. | 99/453 |
| 4,617,861 | 10/1986 | Armstrong | 99/456 |
| 5,003,869 | 4/1991 | Fabricius | 99/453 |

*Primary Examiner*—David A. Scherbel
*Assistant Examiner*—Reginald L. Alexander
*Attorney, Agent, or Firm*—Palmatier, Sjoquist & Helget

[57] ABSTRACT

A method and apparatus of producing reduced lactose milk products by processing raw milk through an ultra high temperature pasteurizer and simultaneously injecting the raw milk and 0.5-3 milliliters per container of lactase enzyme into containers, and immediately sealing the containers, and holding the sealed containers for a predetermined time.

3 Claims, 2 Drawing Sheets

METHOD AND APPARATUS FOR PRODUCING REDUCED LACTOSE MILK

BACKGROUND OF THE INVENTION

The present invention relates to processes for reducing lactose in milk or milk products; more particularly, the invention relates to a process for producing a milk product having at least a 70% reduction of lactose therein.

The reduction of the lactose concentration in milk is accomplished by introducing into the milk a lactase enzyme. When this enzyme is added into a batch of milk, and the milk is held in a holding tank for a predetermined time and at a predetermined temperature, the lactose concentration in the milk becomes reduced. After the step has been completed, the batch may be further processed, as by pasteurizing, and ultimately delivered into containers such as paper/plastic milk cartons. A disadvantage to this approach is that the milk must be batch processed, and the holding time required for permitting the lactase enzyme to reduce the concentration of lactose can range between several hours to more than a day.

SUMMARY OF THE INVENTION

The present invention provides a method and apparatus for producing reduced lactose milk by continuous processing, wherein the pre-packaging holding time for producing the desired lactose/lactase enzyme chemical reaction is eliminated. The inventive process steps include pasteurizing the raw milk in a pasteurizing machine, collecting the pasteurized milk in a surge tank, feeding the milk from the surge tank into a filler nozzle located on the milk carton assembly line, and injecting a predetermined portion of lactase enzyme into each filler carton during the filling process.

It is the principal object of the present invention to provide an improved process for producing reduced lactose milk.

It is another and further object of the invention to provide a process for producing reduced lactose milk without requiring extensive pre-packaging holding times or holding tanks.

It is another object of the present invention to provide a process for producing reduced lactose milk on a continuous process basis.

The foregoing and other objects and advantages of the invention will become apparent from the following specification and drawings, and with reference to the claims.

DESCRIPTION OF THE PREFERRED EMBODIMENT

Figure 1:
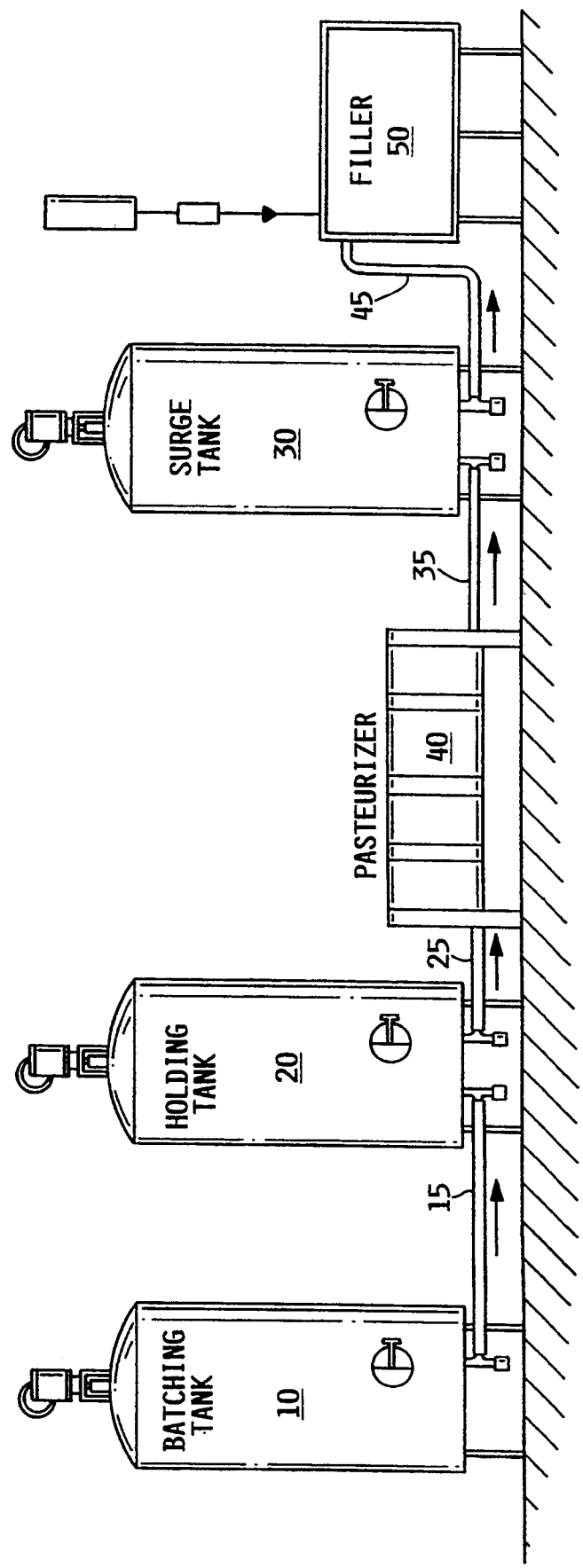
FIG. 1 shows the apparatus and process steps according to the prior art.

Referring first to FIG. 1, there is shown a diagram of the prior art apparatus in process for producing reduced lactose milk. The apparatus includes a batching tank 10 which has an outlet pipe 15 connected to an inlet of a holding tank 20. Holding tank 20 has an outlet pipe 25 which is connected to the input of a pasteurizer 40. Pasteurizer 40 has an outlet pipe 35 which is connected to an input inlet of surge tank 30; surge tank 30 has an outlet pipe 45 which is connected to a filler machine 50. Filler machine 50 may be an automatic filler machine of the type used to fill a plurality of cartons or containers in an assembly line arrangement. All of the components shown in FIG. 1 are commercially well known, and may be identified and selected by those having skill in this art.

The process of FIG. 1 includes adding a quantity of lactase enzyme into the raw milk in batching tank 10. After the enzyme and milk have been mixed, the batch is transferred into a holding tank 20, where it is held for a predetermined time and at a predetermined temperature. The holding time can vary from several hours at temperatures above 70° F., to more than a day at temperatures of approximately 35° F. The holding time is also dependent upon the lactase concentration which was initially introduced into the raw milk in batching tank 10. Typically, the batch in holding tank 20 is held until there is measured at least a 70% conversion of lactose. After this occurs, the batch in holding tank 20 is then passed through pasteurizer 40 and into a surge tank 30. The pasteurizing step effectively stops the conversion process whereby the lactase enzyme reduces the lactose concentration. The batch is held in surge tank 30 until it is used up by filling containers or cartons of milk in the filler machine 50. The batch process may then be repeated by introducing a new batch of raw milk into batching tank 10 and introducing a new predetermined concentration of lactase enzyme into the raw milk.

Figure 2:
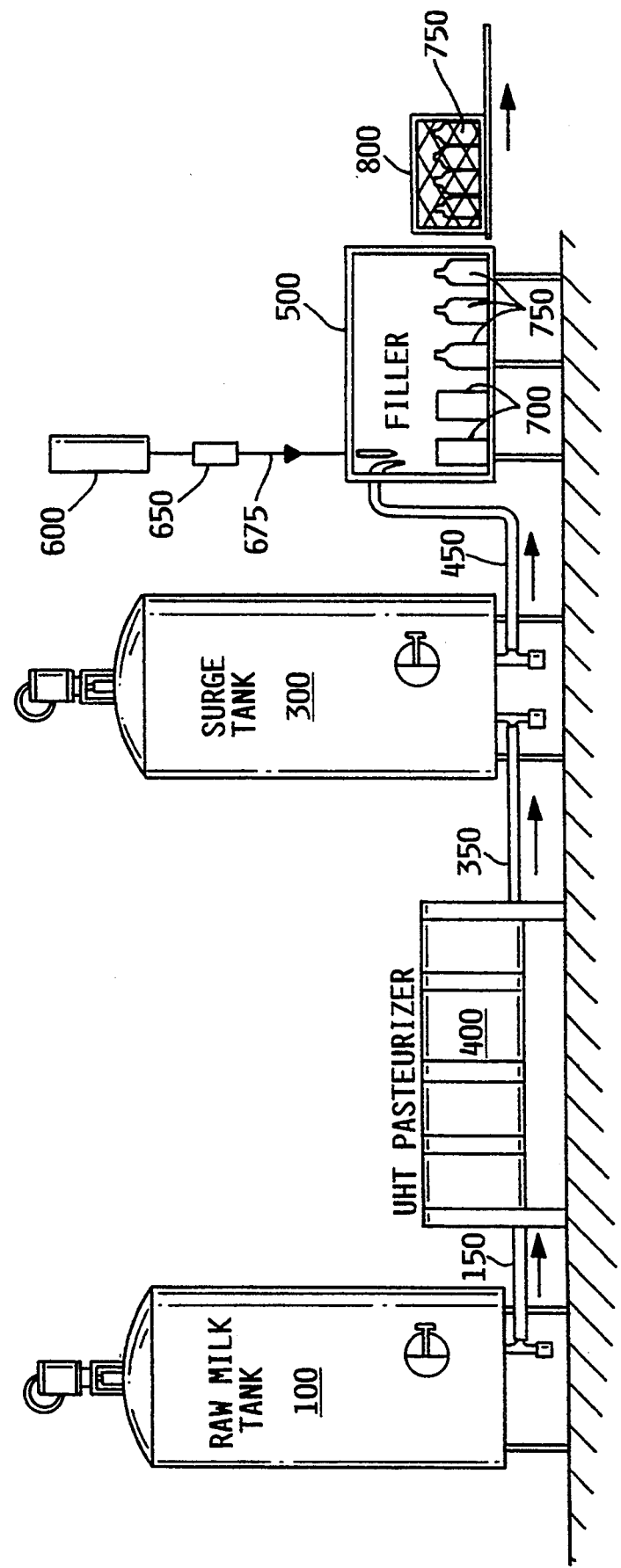
FIG. 2 shows the apparatus and process steps for the present invention.

FIG. 2 shows the process and apparatus for producing reduced lactose milk according to the invention. Raw milk is introduced into tank 100, which has an outlet pipe 150. Outlet pipe 150 is preferably connected into an ultra high temperature pasteurizer 400. Pasteurizer 400 has an outlet pipe 350 connected to a surge tank 300, and surge tank 300 has an outlet pipe 450 connected to a filler machine 500. The respective tanks and filler machine of FIG. 2 may be the same or similar to devices illustrated in FIG. 1, although the raw milk tank 100 may be continuously refilled as the quantity of raw milk in the tank diminishes. The ultra high temperature pasteurizer is a commercially available device, such as the "Direct Heating Uperiser," manufactured by APV Crepaco, Inc., which operates at temperatures above 280° F., for producing a highly sterile pasteurized milk product.

A lactase enzyme tank 600 is positioned near filler machine 500, and has an outlet connection to a sterilizing filter 650. Sterilizing filter 650 has an outlet connection into the filler machine 500, wherein lactase enzyme material may be metered into individual containers 700 or cartons as they are filled. Sterilizing filter 650 may be a commercially available filter, such as Model PFF-VTF20, manufactured by MicroPure Filtration. In the preferred embodiment, commercially available lactase enzyme is diluted in a 2:1 ratio with water, and is placed into tank 600. This diluted mixture of lactase enzyme is injected into cartons in controlled quantities ranging from 0.5-3.0 milliliters per container. The containers may range in size from 8 ounces to 32 ounces, with the lactase enzyme range corresponding to the container size range. The cartons are simultaneously filled with pasteurized milk and the metered quantity of lactase enzyme, and are immediately thereafter sealed as illustrated by carton 750, to provide a completely sterile and noncontaminated finished product.

After the cartons have been filled according to the process shown in FIG. 2, the cartons 750 are normally held as shown by box 800, for a three-day quality assurance period, during which time at least 70% of the lactose becomes reduced as a result of the introduction of the lactase enzyme. Since the lactase enzyme has not been deactivated in any way by being subjected to the pasteurization portion of the process, it continues to reduce essentially all of the lactose over the next several days thereafter.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for producing reduced lactose milk products from raw milk, comprising:
   a) means for conveying said raw milk to a pasteurizer, said pasteurizer including means for pasteurizing said raw milk;
   b) means for conveying pasteurized milk from said pasteurizer to a fill point and means for metering predetermined quantities of said pasteurized milk at said fill point;
   c) a lactase enzyme tank at said fill point and having means for metering predetermined quantities of lactase enzyme at said fill point;
   d) a filling machine for conveying open containers past said fill point for receiving said metered predetermined quantities of said pasteurized milk and said lactase enzyme into each of said containers, and having means for sealing said containers; and
   e) means for storing said containers after sealing for a predetermined length of time; whereby reduced lactose milk is produced.

2. The apparatus of claim 1, wherein said containers range in size from 8 to 32 fluid ounces and said means for metering predetermined quantities of enzyme further comprises metering from 0.5 to 3.0 milliliters per container, proportionate to said container size.

3. The apparatus of claim 2, wherein said means for pasteurizing raw milk further comprises means for pasteurizing at temperatures exceeding 280° F.

* * * * *